US011976425B1

(12) United States Patent
Khlyzov

(10) Patent No.: US 11,976,425 B1
(45) Date of Patent: May 7, 2024

(54) PAVING AND LIGHTING SYSTEM

(71) Applicant: Vladislav Khlyzov, Reno, NV (US)

(72) Inventor: Vladislav Khlyzov, Reno, NV (US)

( * ) Notice: Subject to any disclaimer, the term of this patent is extended or adjusted under 35 U.S.C. 154(b) by 0 days.

(21) Appl. No.: 18/231,325

(22) Filed: Aug. 8, 2023

(51) Int. Cl.

| | |
|---|---|
| ***F21S 4/28*** | (2016.01) |
| ***E01C 17/00*** | (2006.01) |
| ***F21S 8/02*** | (2006.01) |
| ***F21V 3/06*** | (2018.01) |
| ***F21Y 115/10*** | (2016.01) |

(52) U.S. Cl.
CPC ................ *E01C 17/00* (2013.01); *F21S 4/28* (2016.01); *F21S 8/022* (2013.01); *F21V 3/06* (2018.02); *F21Y 2115/10* (2016.08)

(58) Field of Classification Search
CPC ...... F21V 33/006; F21V 15/01; F21V 21/005; F21V 21/02; F21V 21/04; F21V 3/06; F21S 8/022; F21S 4/28; F21S 8/02; F21Y 115/10
See application file for complete search history.

(56) References Cited

U.S. PATENT DOCUMENTS

| | | | | |
|---|---|---|---|---|
| 7,654,717 | B2 * | 2/2010 | Trujillo | G02B 6/001 362/147 |
| 7,918,579 | B2 | 4/2011 | Hamar | |
| 8,567,991 | B2 | 10/2013 | Krogman | |
| 10,998,735 | B2 | 5/2021 | Chien | |
| 11,000,142 | B2 | 5/2021 | Girard | |
| 2006/0262542 | A1 | 11/2006 | Ibbitson | |
| 2016/0186968 | A1 * | 6/2016 | Edwards | F21K 9/64 362/84 |
| 2018/0087225 | A1 * | 3/2018 | McNeeley | E01C 17/00 |

FOREIGN PATENT DOCUMENTS

WO WO2017178703 10/2017

* cited by examiner

*Primary Examiner* — William J Carter

(57) ABSTRACT

A paving and lighting system for lighting a pathway includes a plurality of frame members which are arranged with respect to each other to define a framework. The framework lies substantially on a plane and defines a plurality of paver receiving cells. Each one of a plurality of paver tiles is positioned in an associated paver receiving cell of the plurality of paver receiving cells. Each one of a plurality of light strips is coupled to and positioned atop an associated frame member of the plurality of frame members. A processor is operatively coupled to each light strip of the plurality of light strips. The processor selectively operates the plurality of light strips to emit a selected light pattern.

18 Claims, 16 Drawing Sheets

PAVING AND LIGHTING SYSTEM

(b) CROSS-REFERENCE TO RELATED APPLICATIONS

Not Applicable

(c) STATEMENT REGARDING FEDERALLY SPONSORED RESEARCH OR DEVELOPMENT

Not Applicable

(d) THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

(f) STATEMENT REGARDING PRIOR DISCLOSURES BY THE INVENTOR OR JOINT INVENTOR

Not Applicable

(g) BACKGROUND OF THE INVENTION

(1) Field of the Invention

The disclosure relates to paving and lighting systems and more particularly pertains to a new paving and lighting system for lighting a pathway.

(2) Description of Related Art Including Information Disclosed Under 37 CFR 1.97 and 1.98

The prior art describes paving and lighting systems in which light sources are placed in or integrated with paving tiles to light a pathway defined by the paving tiles and to display images or light patterns on the pathway. However, the prior art fails to describe such an apparatus in which the paving tiles are placed in a framework which incorporates light sources to light the pathway and display a selected light pattern.

(h) BRIEF SUMMARY OF THE INVENTION

An embodiment of the disclosure meets the needs presented above by generally comprising a plurality of frame members which are arranged with respect to each other to define a framework. The framework lies substantially on a plane and defines a plurality of paver receiving cells. Each one of a plurality of paver tiles is positioned in an associated paver receiving cell of the plurality of paver receiving cells. Each one of a plurality of light strips is coupled to and positioned atop an associated frame member of the plurality of frame members. A processor is operatively coupled to each light strip of the plurality of light strips. The processor selectively operates the plurality of light strips to emit a selected light pattern.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(j) DETAILED DESCRIPTION OF THE INVENTION

Figure 1:
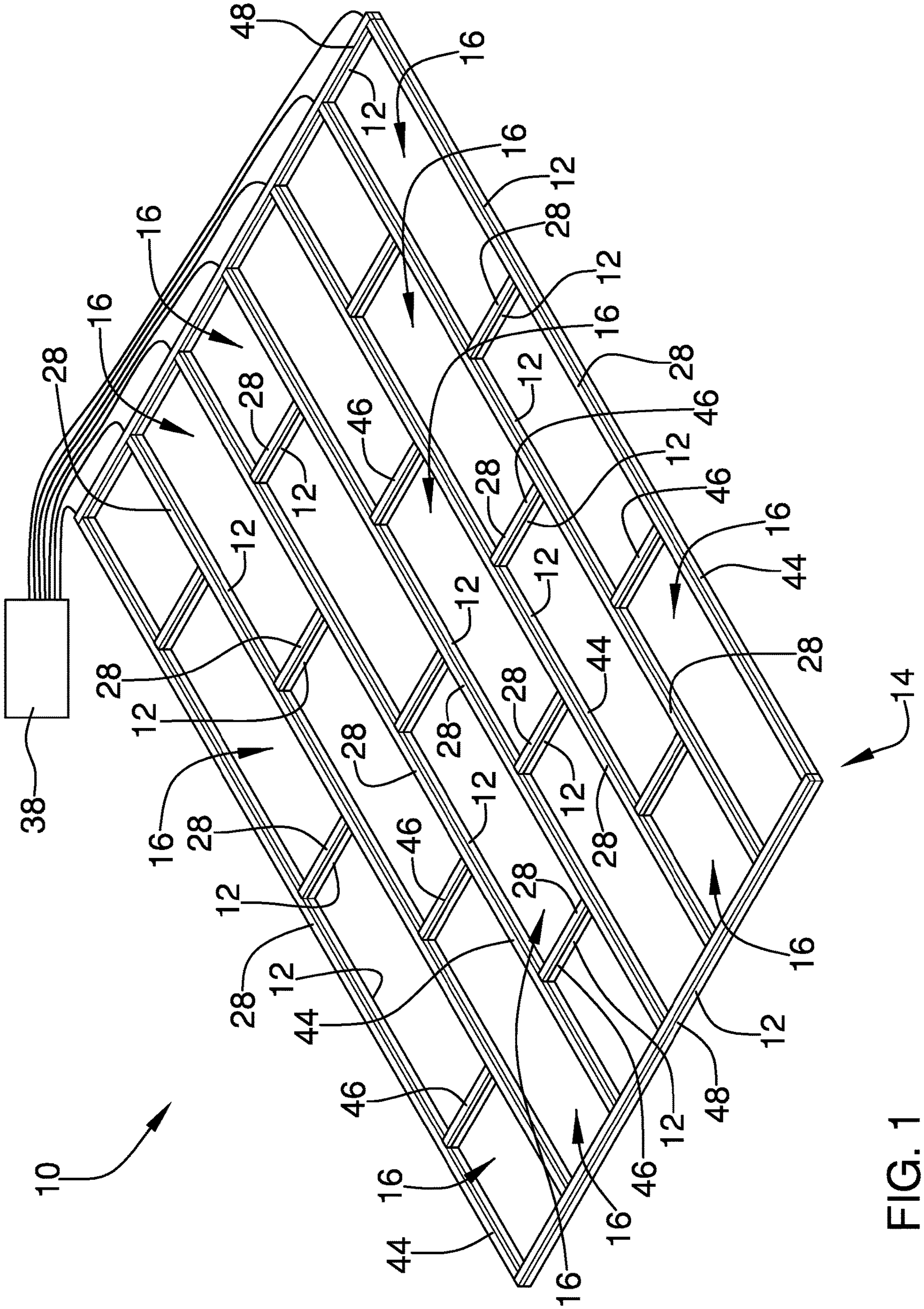
FIG. 1 is a perspective view of a plurality of light strips and a framework of a paving and lighting system according to an embodiment of the disclosure.
Figure 2:
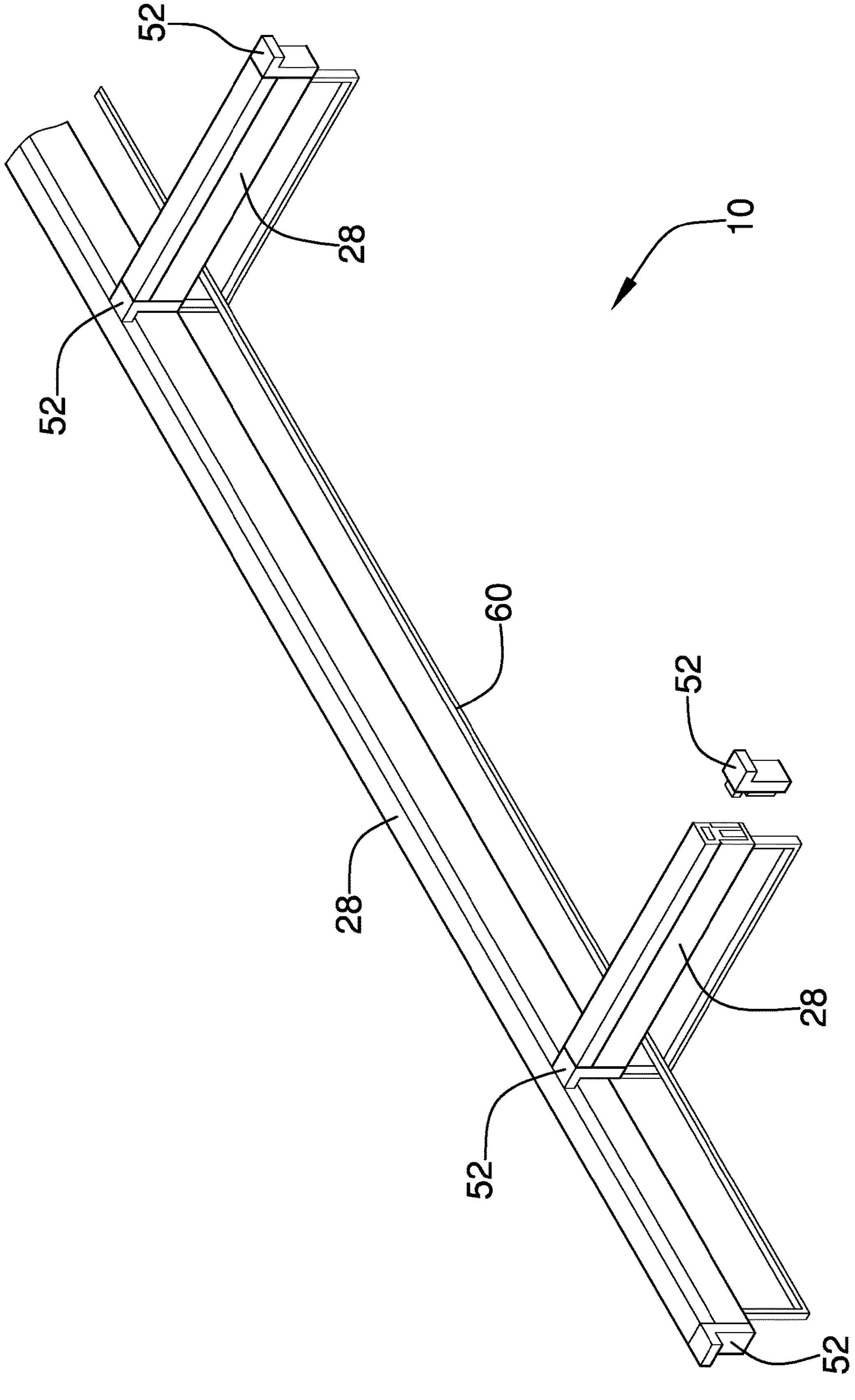
FIG. 2 is a perspective view of a plurality of light strips of an embodiment of the disclosure.
Figure 3:
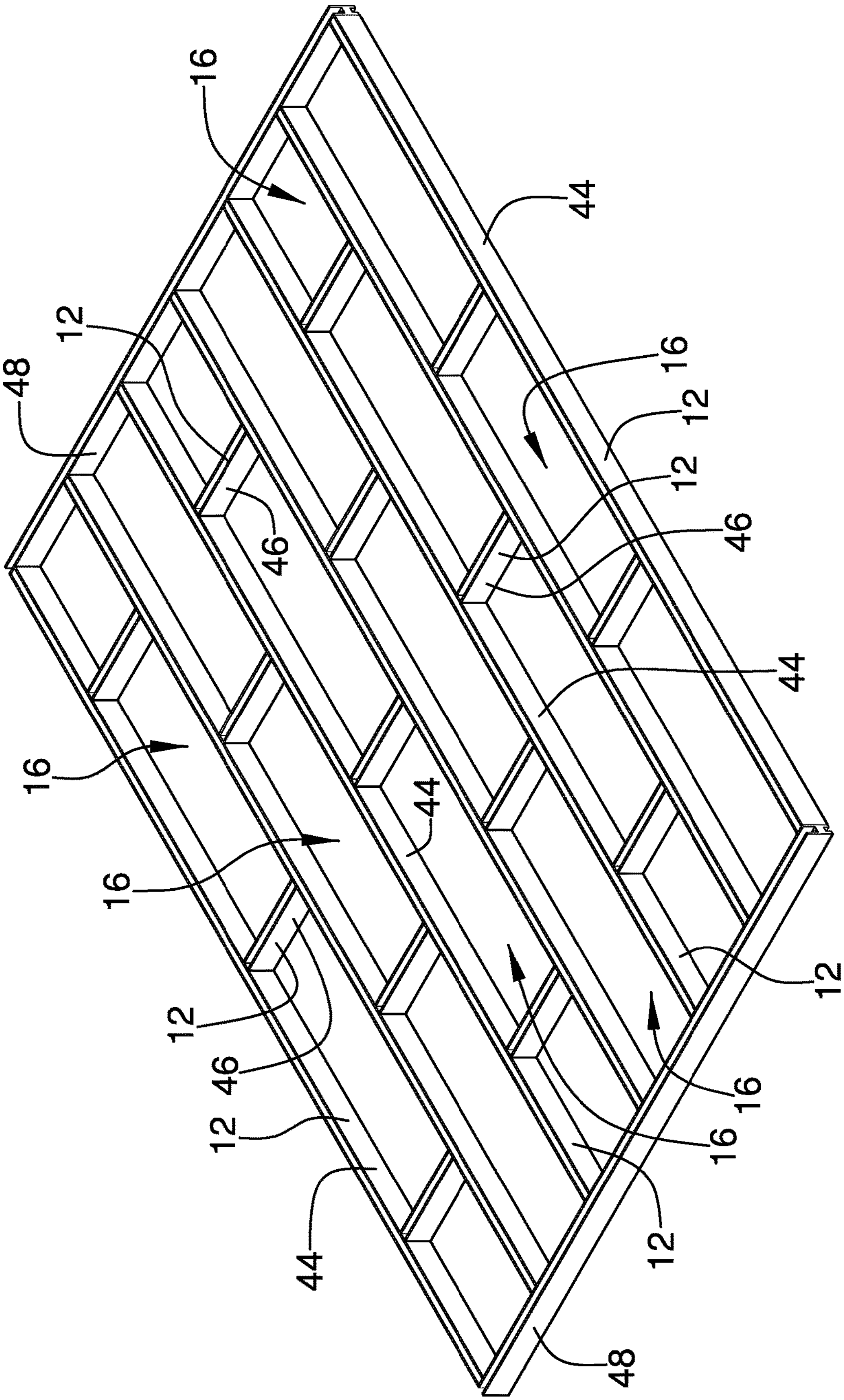
FIG. 3 is a perspective view of a framework of an embodiment of the disclosure.
Figure 4:
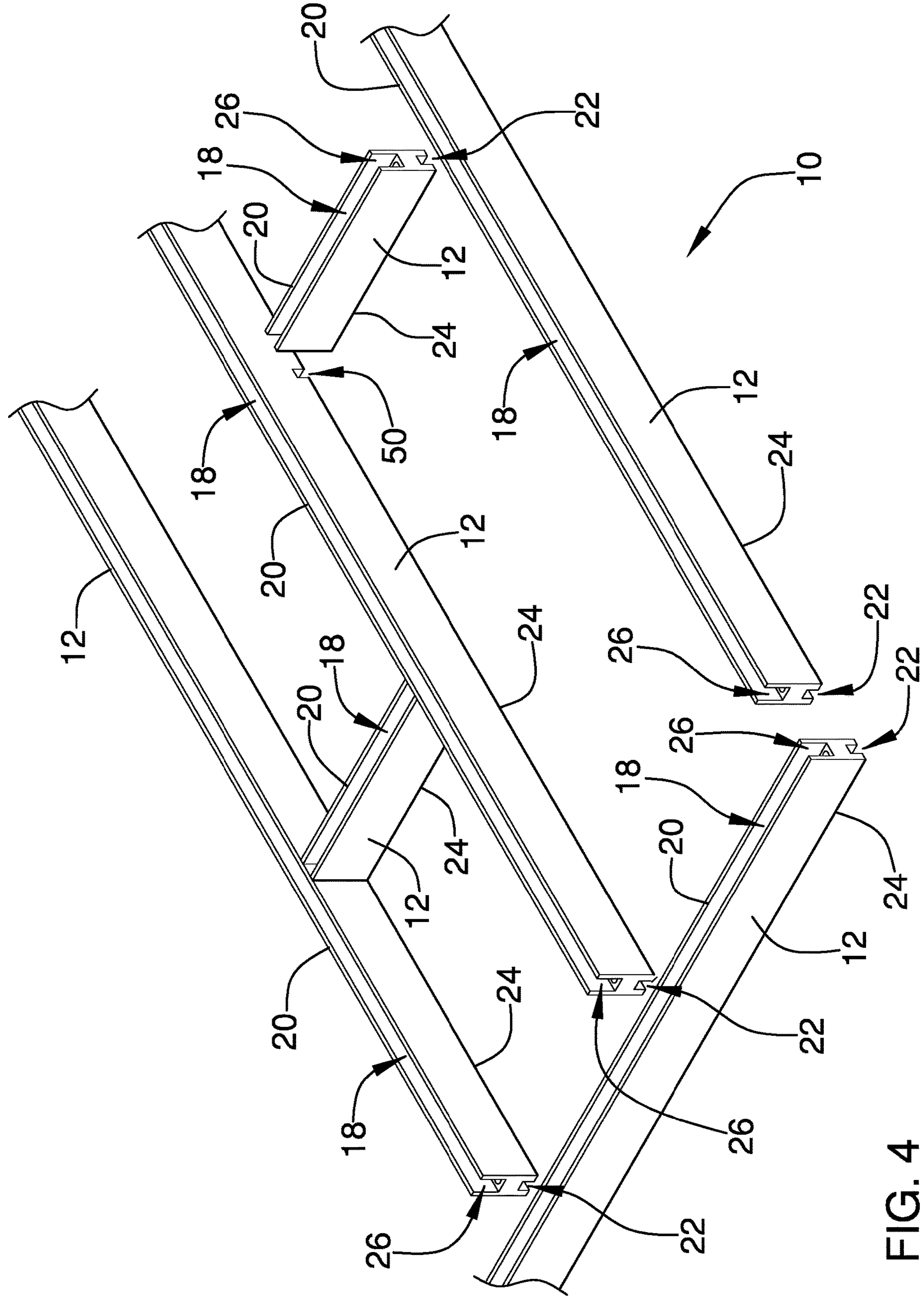
FIG. 4 is a detail perspective view of a framework of an embodiment of the disclosure.
Figure 5:
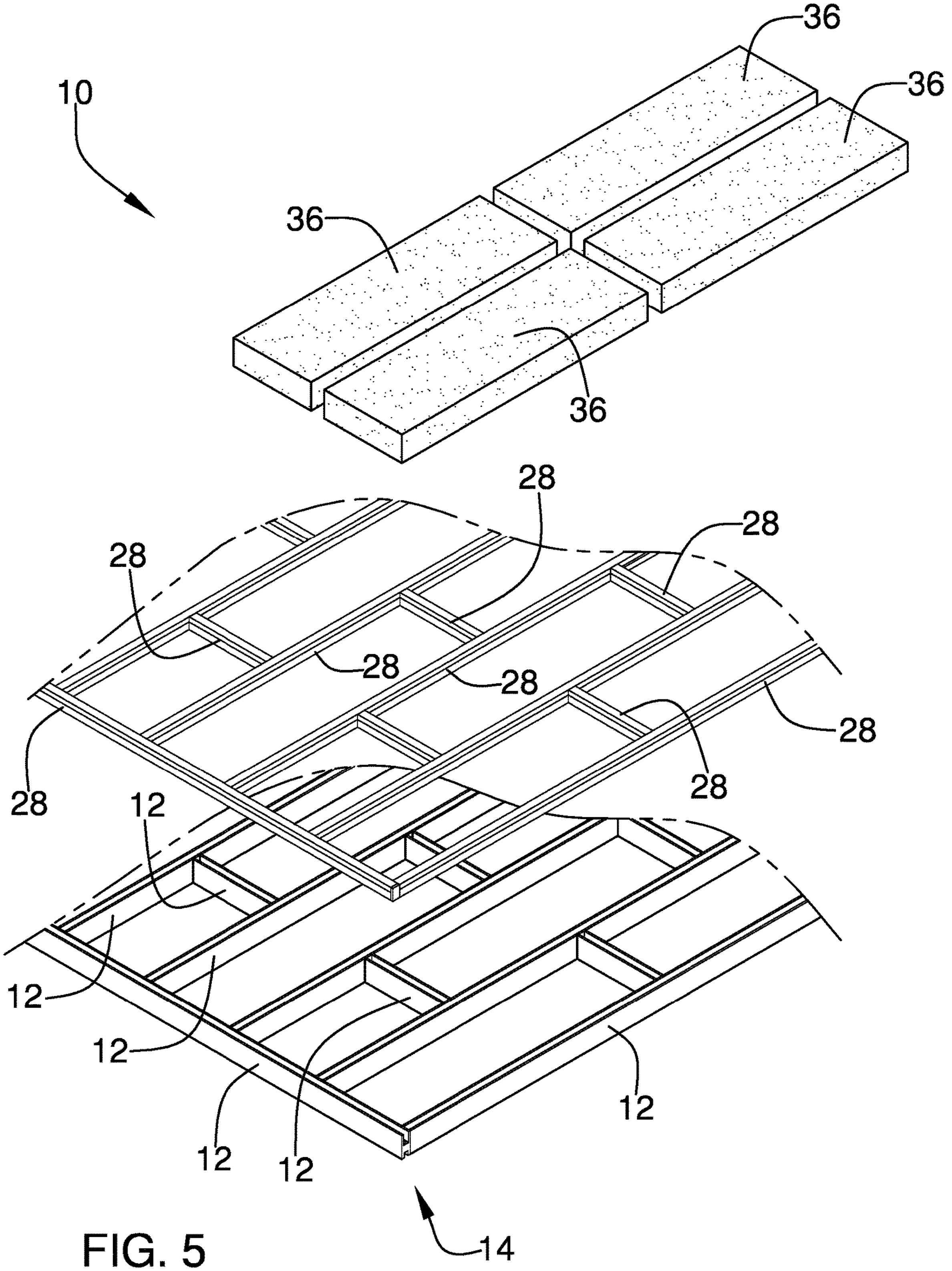
FIG. 5 is an exploded detail view of an embodiment of the disclosure.
Figure 6:
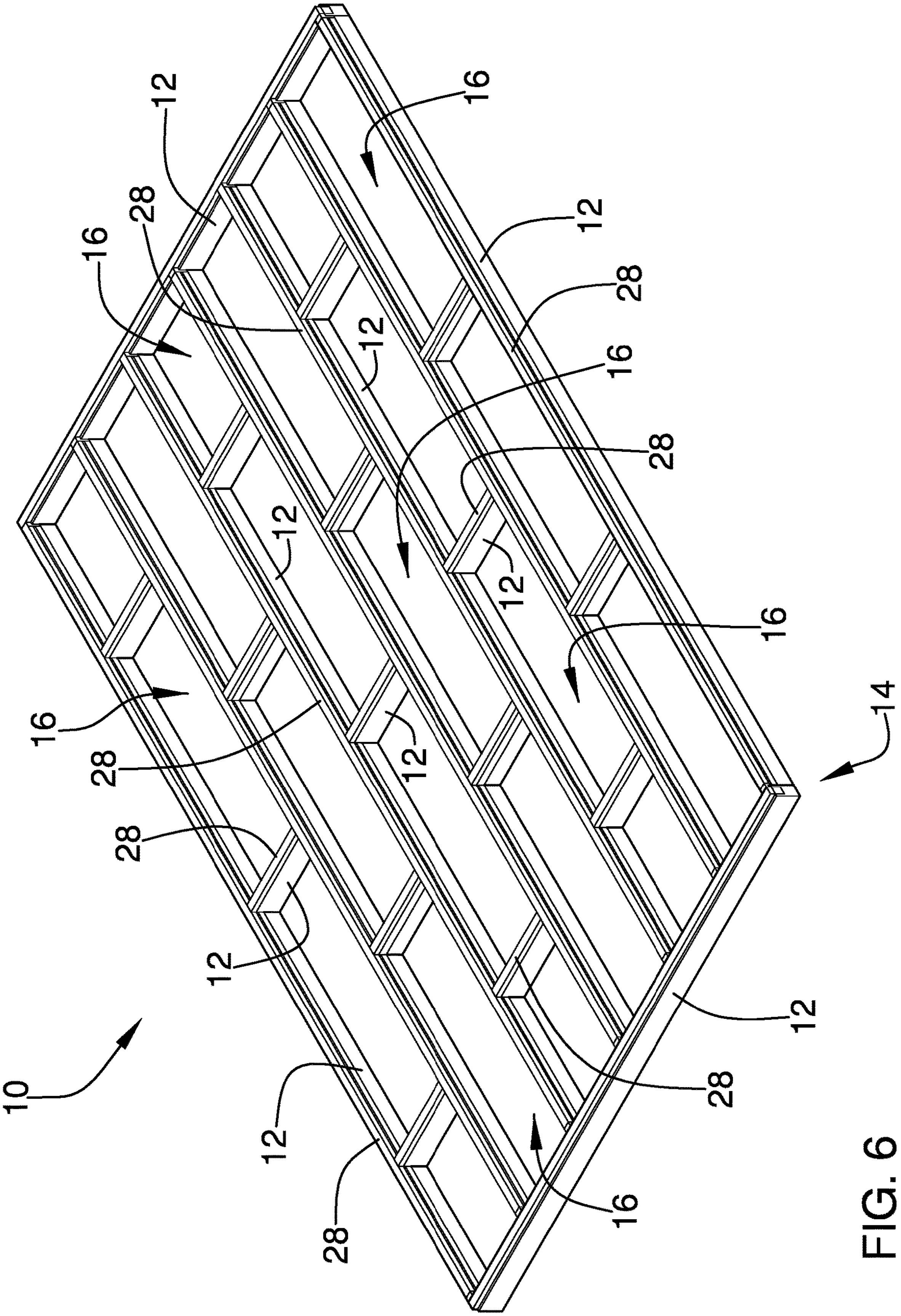
FIG. 6 is a perspective view of a plurality of light strips and a framework of an embodiment of the disclosure.
Figure 7:
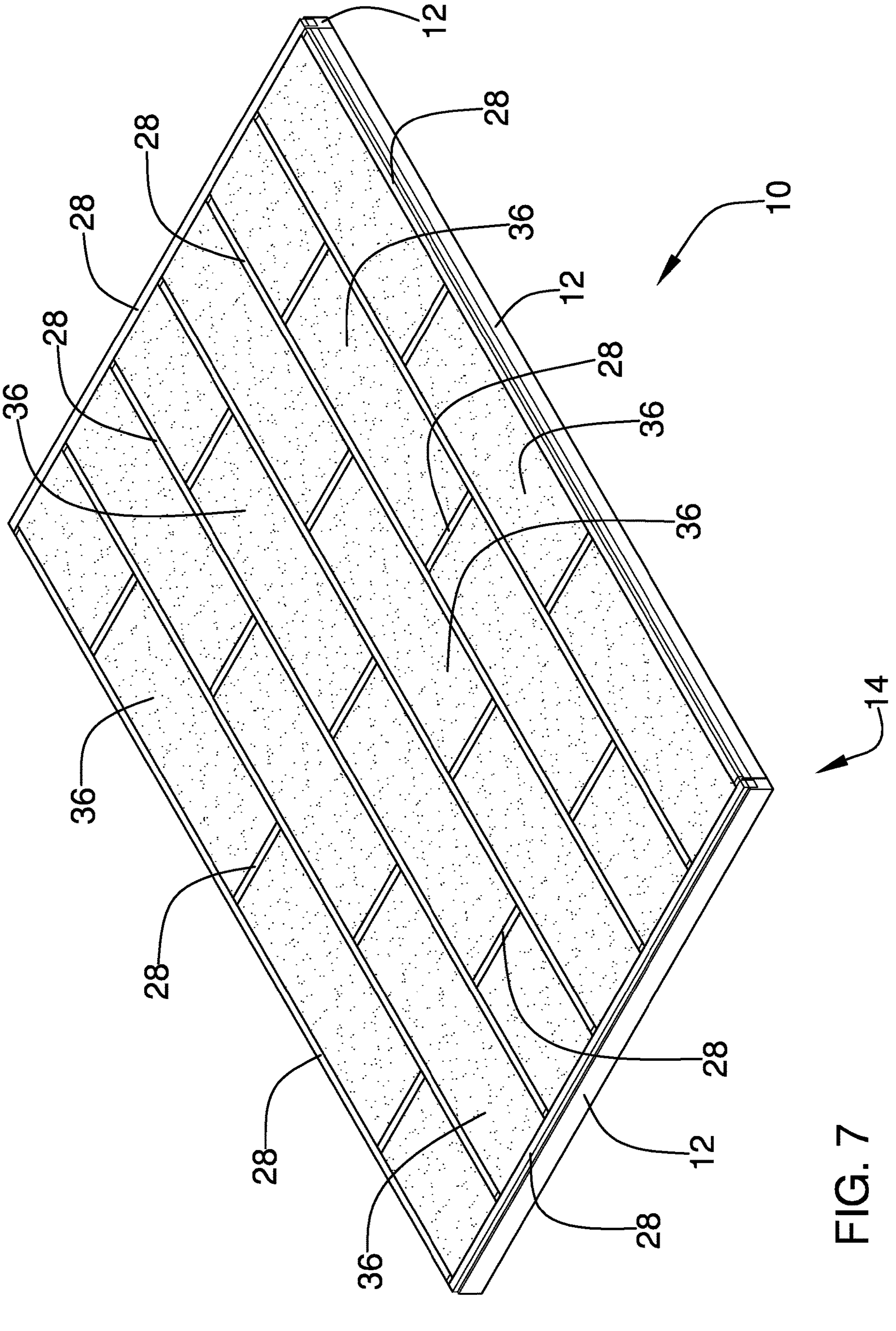
FIG. 7 is a perspective view of an embodiment of the disclosure.
Figure 8:
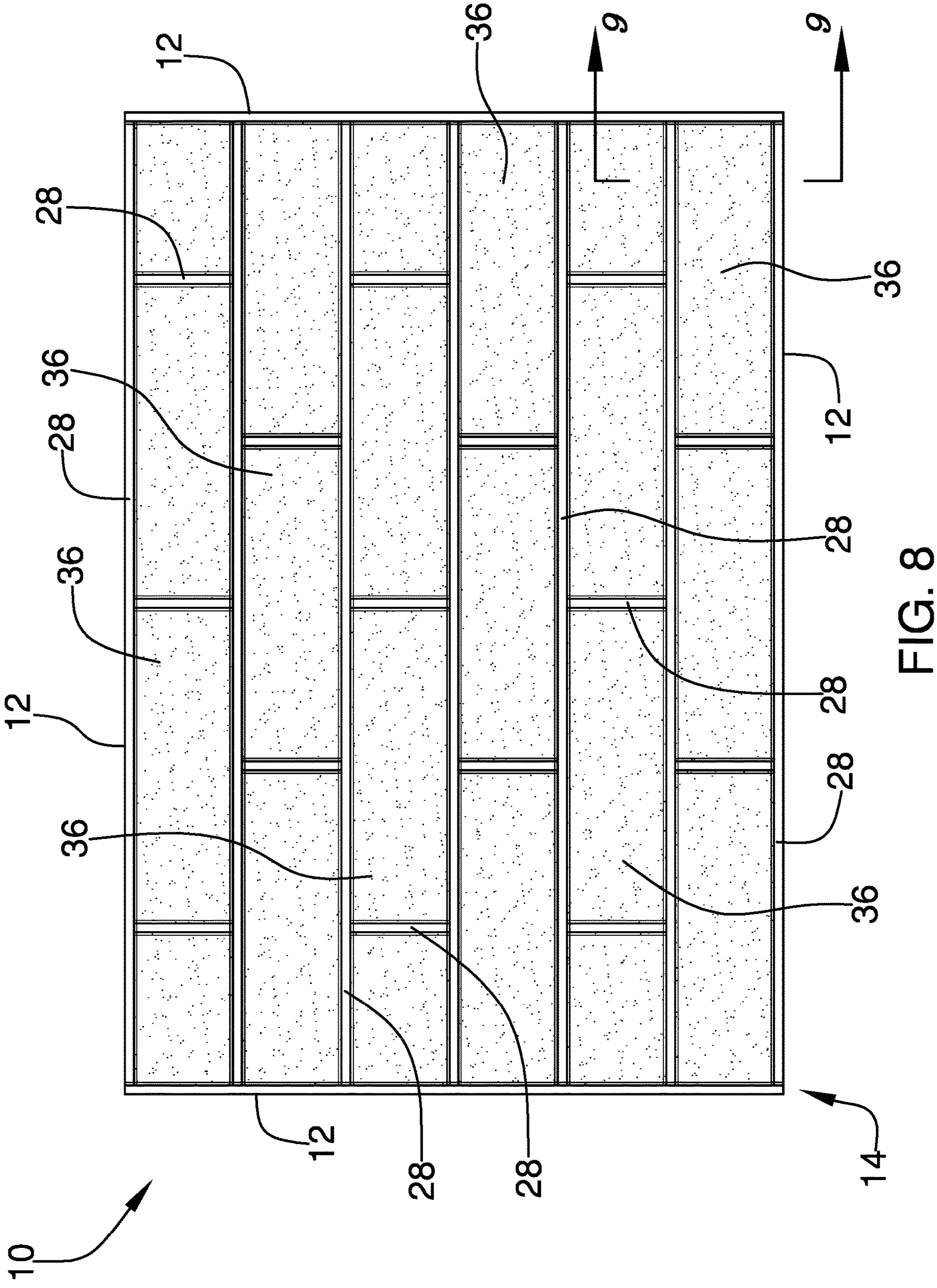
FIG. 8 is a top view of an embodiment of the disclosure.
Figure 9:
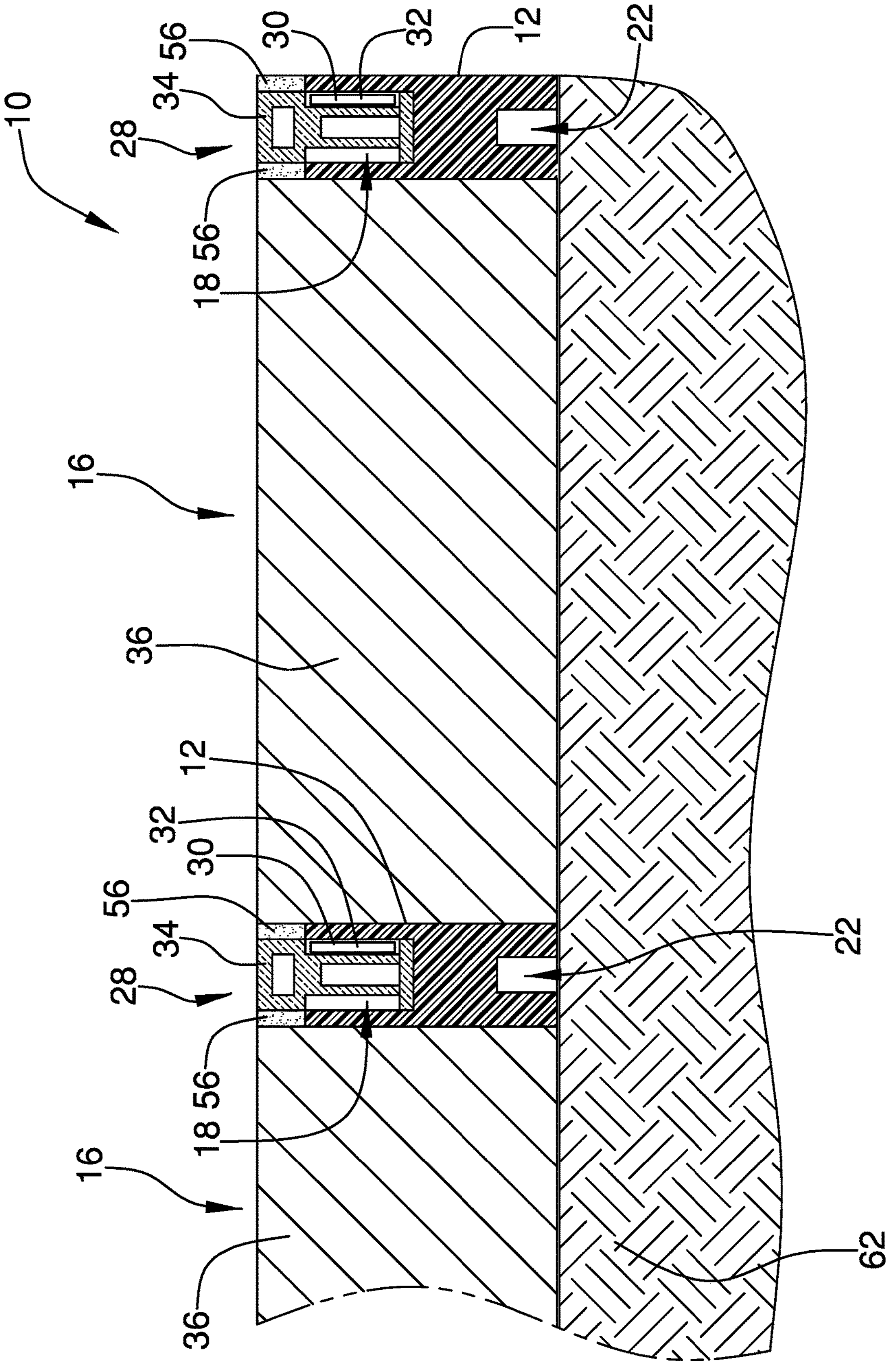
FIG. 9 is a cross section view of an embodiment of the disclosure taken from Arrows 9-9 in FIG. 8.
Figure 10:
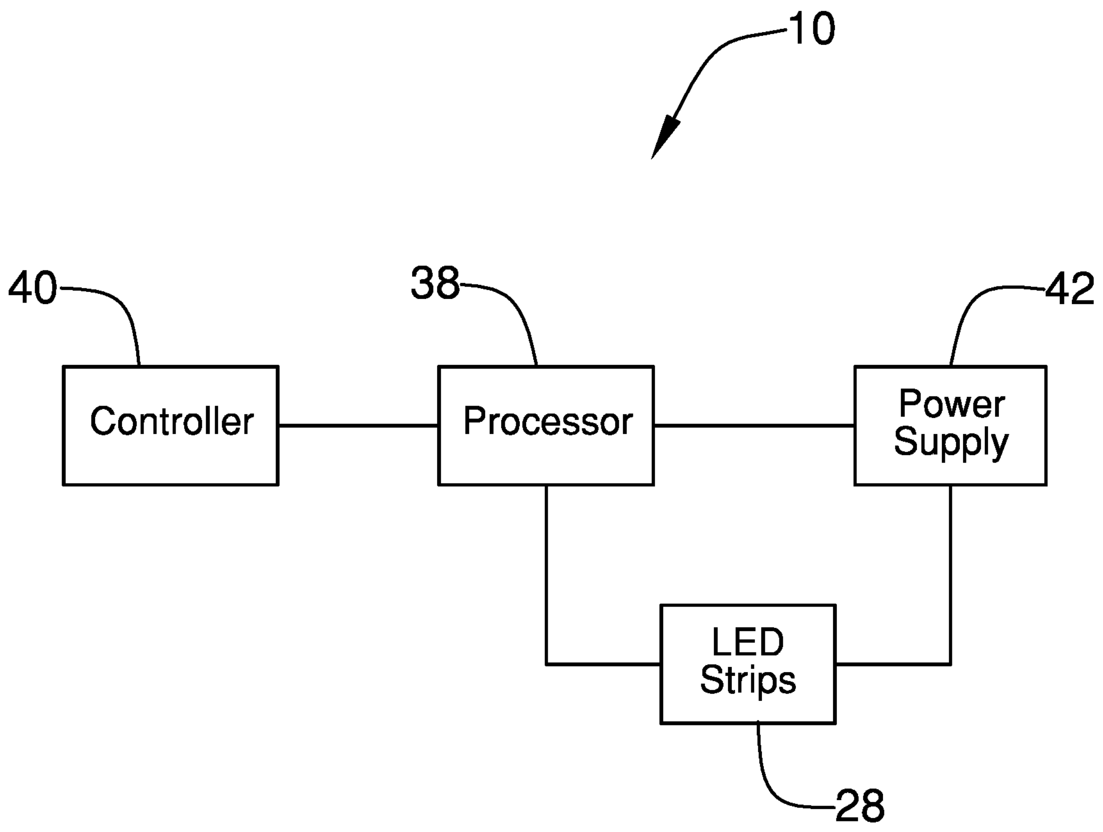
FIG. 10 is a block diagram of an embodiment of the disclosure.
Figure 11:
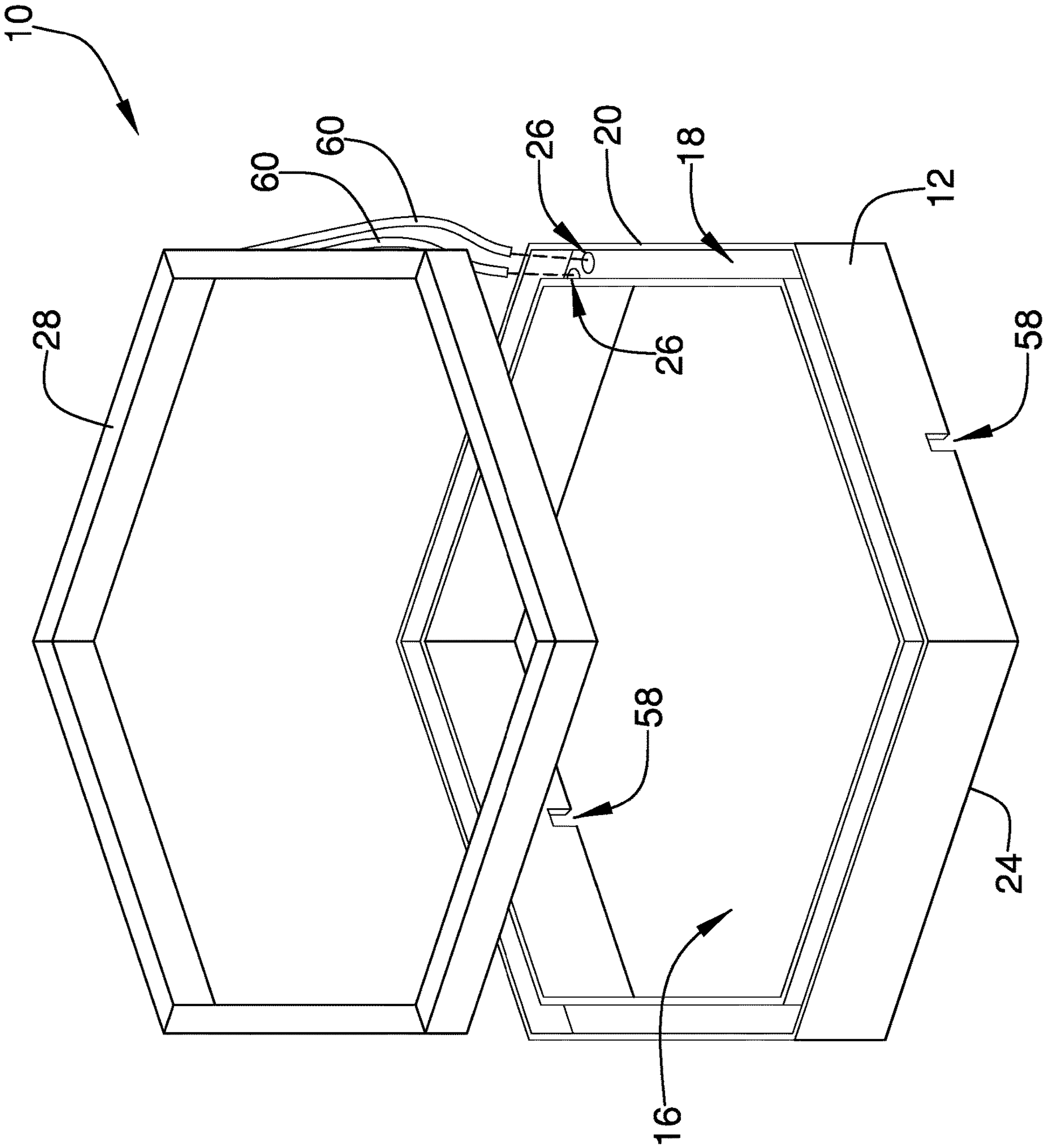
FIG. 11 is a top exploded perspective view of a frame member and a light strip of an embodiment of the disclosure.
Figure 12:
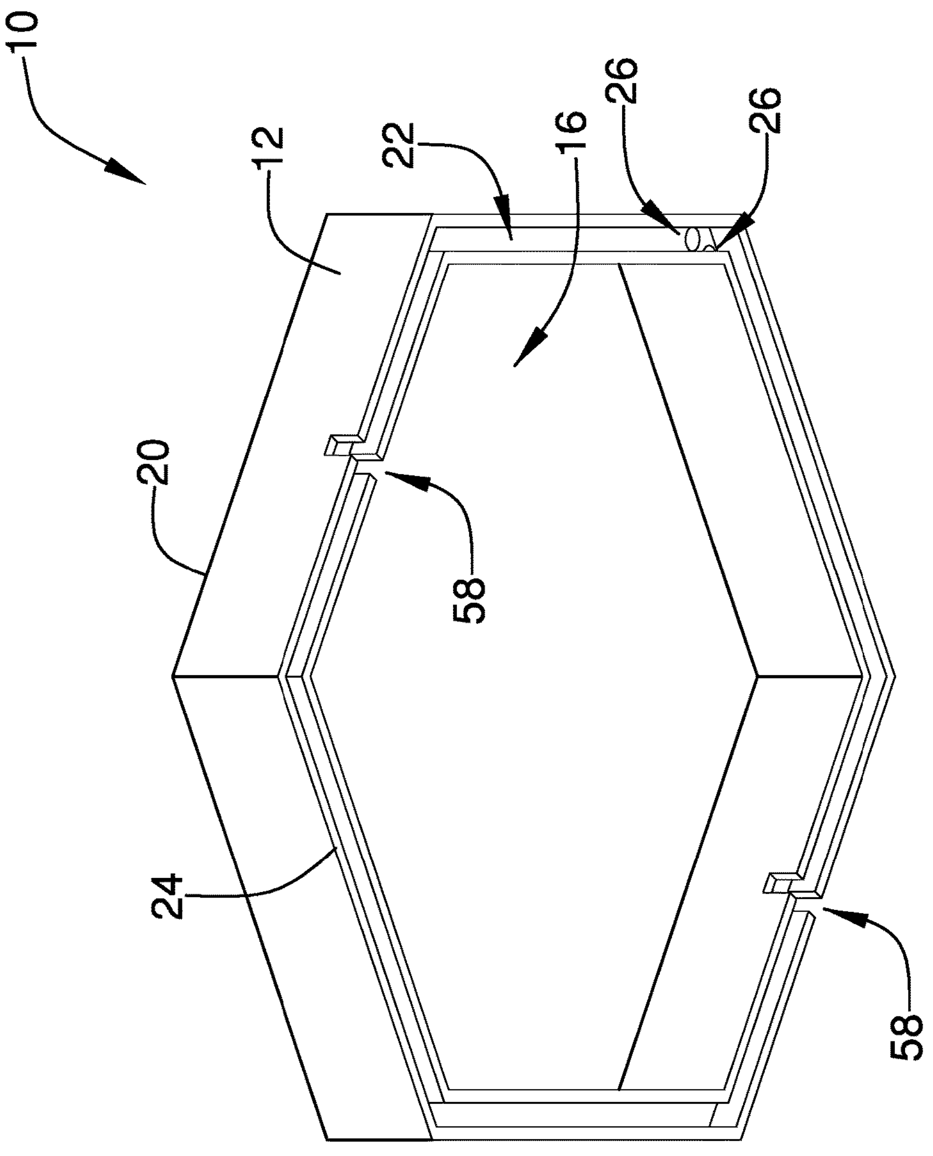
FIG. 12 is a bottom perspective view of a frame member of an embodiment of the disclosure.
Figure 13:
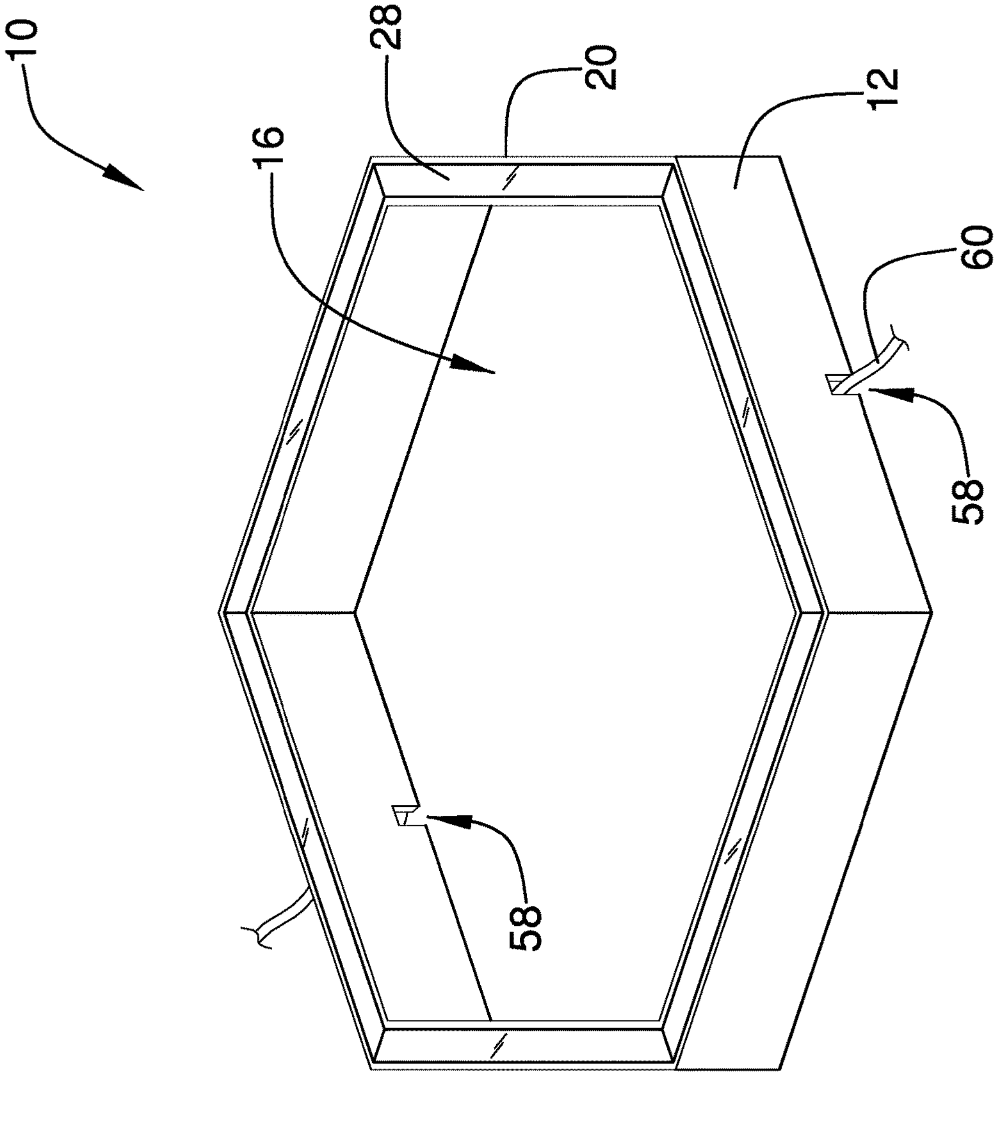
FIG. 13 is a top perspective view of a frame member and a light strip of an embodiment of the disclosure.
Figure 14:
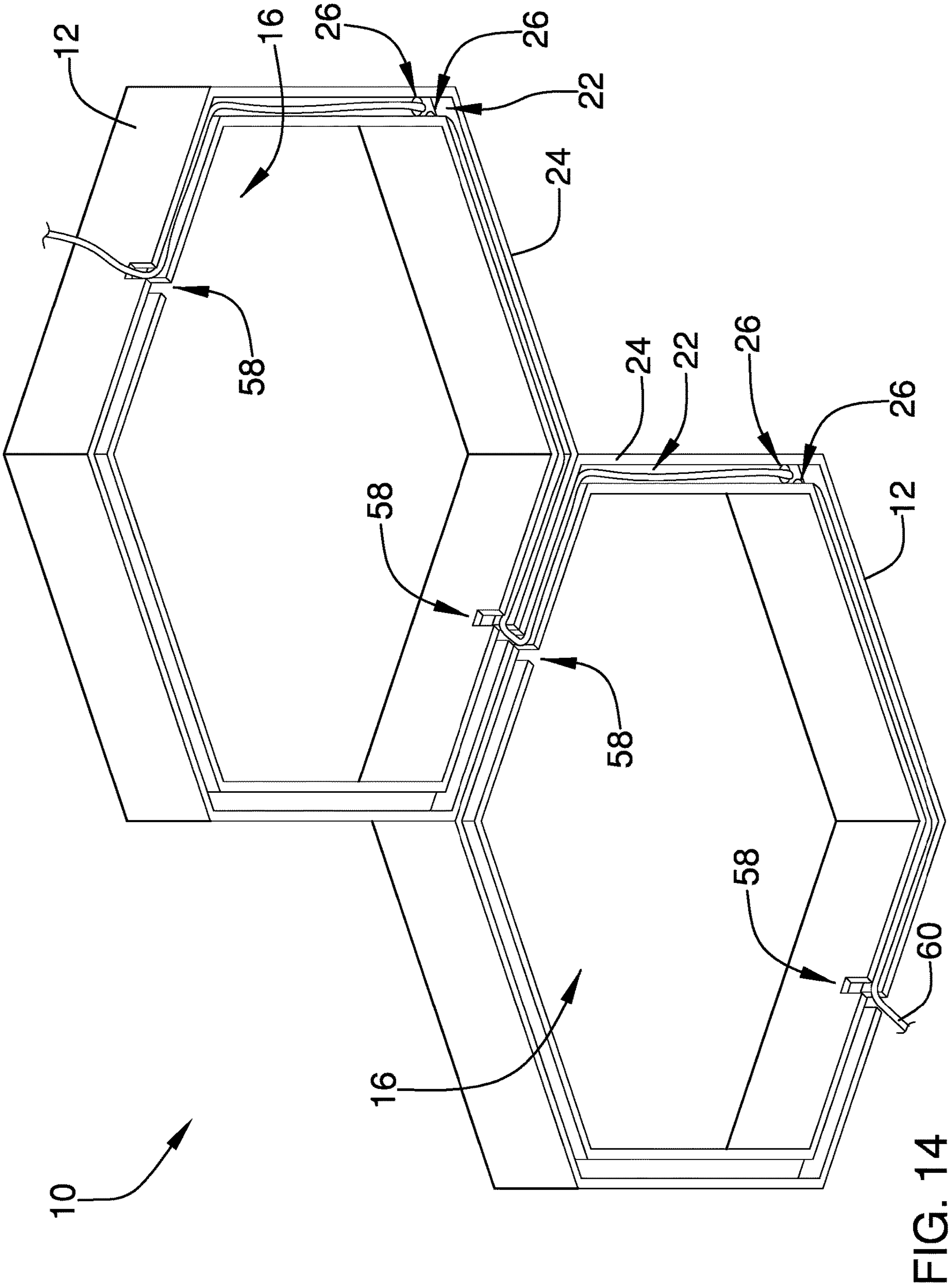
FIG. 14 is a bottom perspective view of a pair of frame members of an embodiment of the disclosure.
Figure 15:
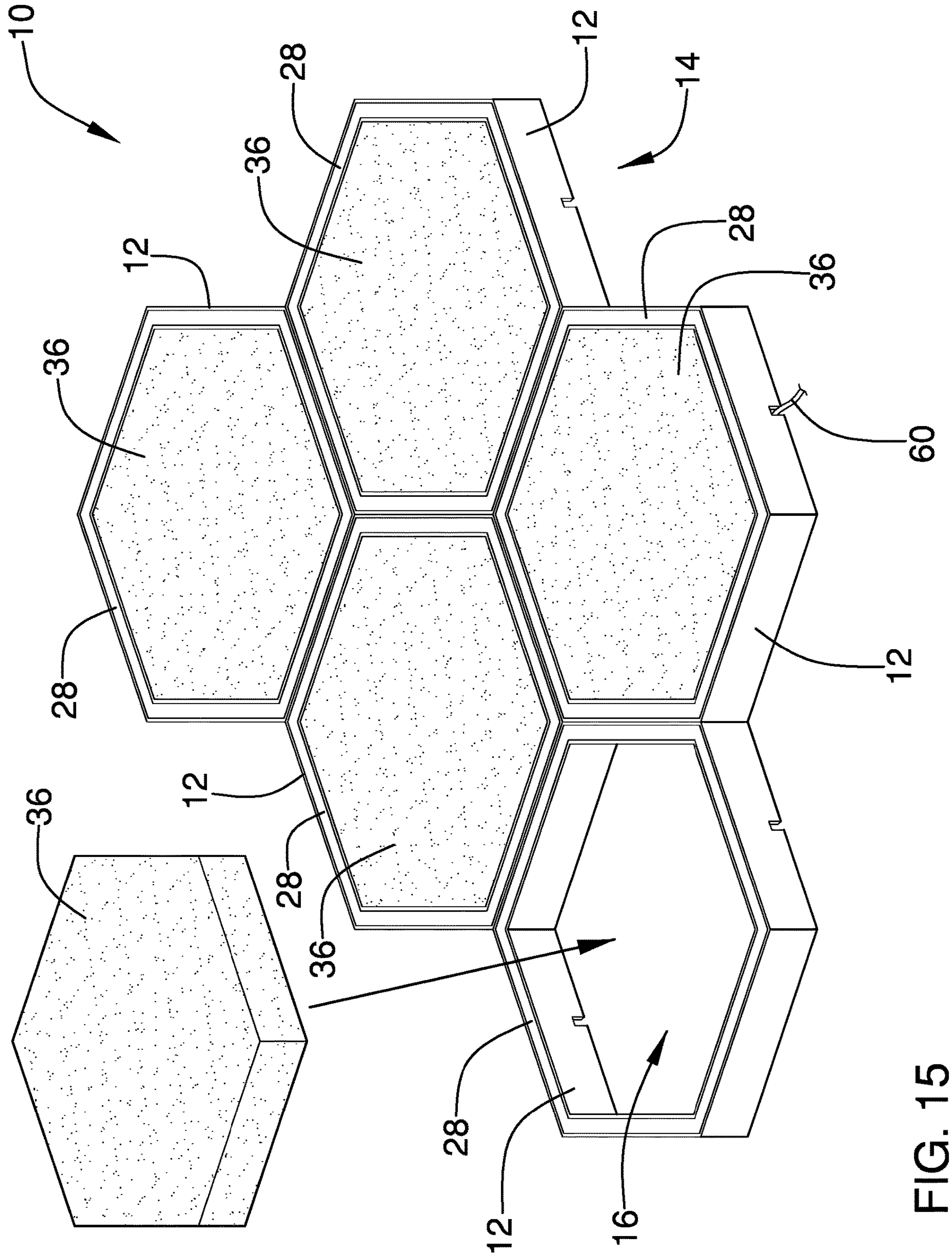
FIG. 15 is a top perspective view of an embodiment of the disclosure.
Figure 16:
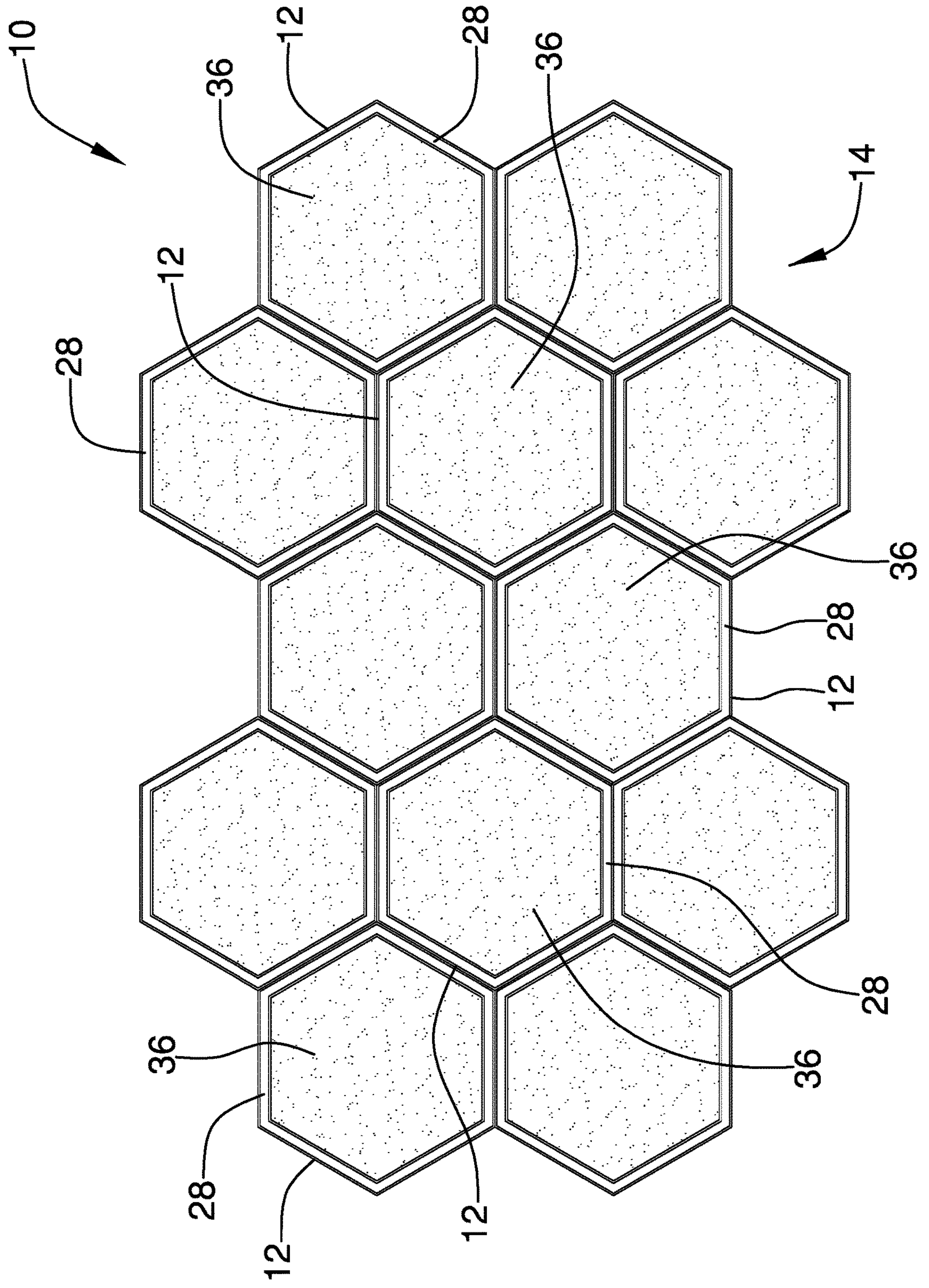
FIG. 16 is a top view of an embodiment of the disclosure.

With reference now to the drawings, and in particular to FIGS. 1 through 16 thereof, a new paving and lighting system embodying the principles and concepts of an embodiment of the disclosure and generally designated by the reference numeral 10 will be described.

As best illustrated in FIGS. 1 through 16, the paving and lighting system 10 generally comprises a plurality of frame members 12 which are arranged with respect to each other to define a framework 14. The plurality of frame members 12 may be held together via a friction fit, nails, threaded fasteners, adhesives, or the like. The framework 14 lies substantially on a plane and is adapted to lie on a ground surface 62. The ground surface 62 need not be perfectly flat, and the framework 14 may be contoured to deviate from the plane such that the framework 14 conforms to the ground surface 62. The framework 14 defines a plurality of paver receiving cells 16. Each frame member 12 of the plurality of frame members 12 defines a lighting groove 18 on a top side 20 of the frame member 12 and a wiring groove 22 on a bottom side 24 of the frame member 12. The wiring groove 22 has a size such that the wiring groove 22 is configured for receiving wiring 60. Each frame member 12 of the plurality of frame members 12 additionally has a pair of wiring holes 26 extending through the frame member 12 from the lighting groove 18 to the wiring groove 22. Each wiring hole 26 of the pair of wiring holes 26 has a size such that the wiring hole 26 is may receive the wiring 60.

A plurality of light strips 28 is provided and mounted to the framework 14. Each light strip 28 of the plurality of light strips 28 is coupled to and positioned atop an associated frame member 12 of the plurality of frame members 12. Each light strip 28 of the plurality of light strips 28 is positioned in the lighting groove 18 of the associated frame member 12. Each light strip 28 of the plurality of light strips 28 comprises a plurality of light sources 30, a plurality of circuit modules 32, and a diffuser 34. The plurality of light sources 30 is evenly spaced along a length of the light strip 28 and comprises a light-emitting diode. Each circuit module 32 is operatively coupled to an associated light source 30 of the plurality of light sources 30 such that each light source 30 of the plurality of light sources 30 is individually addressable. In some embodiments, each circuit module 32 operates three or more light-emitting diodes and may be capable of emitting light in wavelengths throughout the visible spectrum.

The diffuser 34 is positioned above the plurality of light sources 30 with respect to the associated frame member 12 and comprises a light-diffusing material such that the diffuser 34 is configured to diffuse light produced by the plurality of light sources 30. The light-diffusing material comprises silicone but may comprise glass, other polymers, or the like. An advantage of silicone over some polymers is the ability of silicone to resist degradation from ultraviolet light, and it will be understood that other polymers and materials which diffuse light as described and resist degradation from ultraviolet light are included as suitable materials for the diffuser 34. The diffuser 34 acts to lessen the variation in appearance between areas of the light strips 28 with light sources 30 and the areas without the light sources 30.

Each one of a plurality of paver tiles 36 is positioned in an associated paver receiving cell 16 of the plurality of paver receiving cells 16. The plurality of paver tiles 36 may be joined to the framework 14 via a friction fit, mortar joints, adhesives, or the like. Each paver tile 36 of the plurality of paver tiles 36 is complementary in shape to the associated paver receiving cell 16. A processor 38 is operatively coupled to each light strip 28 of the plurality of light strips 28 and is positioned remotely from the framework 14. The processor 38 selectively operates the plurality of light strips 28 to emit a selected light pattern. A controller 40 is operatively coupled to the processor 38 and may be used to select a light pattern for emission by the plurality of light strips 28. The controller 40 may include, for example, switches, buttons, a touch screen, or the like. One or both of the controller 40 and the processor 38 may have computer-readable instructions for receiving input from a user to design one or more light patterns. Light patterns also may be stored on a memory of the processor 38. A power source 42 is electrically coupled to the processor 38 and each light strip 28 of the plurality of light strips 28.

In one embodiment, as depicted in FIGS. 1 through 10, each frame member 12 of the plurality of frame members 12 is elongated, and the lighting groove 18 and the wiring groove 22 extend fully along a length of the frame member 12. Each light strip 28 of the plurality of light strips 28 also extends fully along the length of the associated frame member 12. The plurality of frame members 12 of this embodiment includes a set of first frame members 44, a set of second frame members 46, and a pair of boundary frame members 48. The frame members 12 of the set of first frame members 44 are evenly spaced from each other in a first direction and extend in a second direction perpendicular to the first direction. Each second frame member 46 of the plurality of second frame members 46 extends between an associated pair of adjacent first frame members 44 of the plurality of first frame members 44. Each first frame member 44 of the associated pair of adjacent first frame members 44 has a notch 50 adjacent to the second frame member 46 which is in fluid communication with the wiring groove 22 of the first frame member 44 and the wiring groove 22 of the second frame member 46. Each boundary frame member 48 of the pair of boundary frame members 48 extends along a boundary of the framework 14 in the first direction and is spaced from each other in the second direction. The paver receiving cells 16 of the resultant framework 14 formed by the plurality of frame members 12 each have a rectangular shape.

This one embodiment further comprises a plurality of end caps 52, each of which is positioned on an associated end 54 of a pair of ends 54 of an associated light strip 28 of the plurality of light strips 28. Each end cap 52 has an inverted L-shape such that the end cap 52 extends over an adjacent frame member 12. Each end cap 52 of the plurality of end caps 52 also comprises the light-diffusing material, the effect being that light is diffused through the end caps 52 to give a more continuous appearance to the light emitted by adjacent light strips 28. A fill medium 56 is positioned over the framework 14 between the plurality of paver tiles 36 and the plurality of light strips 28. The fill medium 56 comprises a polymer cement mortar but may comprise any suitable mortar joint material.

Referring to FIGS. 11 through 16, each frame member 12 of the plurality of frame members 12 forms a closed loop. The lighting groove 18 and the wiring groove 22 extend fully around the closed loop. The plurality of frame members 12 is positioned in abutment with each other in a tessellation. The closed loop has a hexagonal shape but may comprise any suitable polygonal shape. Each frame member 12 of the plurality of frame members 12 has a plurality of notches 58 on a bottom side 24 of the frame member 12 such that the plurality of frame members 12 facilitate a passage of the wiring 60 between the wiring grooves 22 of adjacent frame members 12 of the plurality of frame members 12.

In some embodiments, the tops of the paver tiles 36, the light strips 28, and the fill medium 56, if used, define a continuous, smooth surface. In other embodiments, the light strips 28 may be inset below the tops of the paver tiles 36. The light strips 28 may be sealed to prevent water and other harmful elements from contacting electrical components within the light strips 28. The frame members 12 and the fill medium 56 may in part seal the light strips 28.

In use, the processor 38 operates the plurality of light strips 28 to emit the selected light pattern. The controller 40 may be used to select the light pattern, design new light patterns, and to deactivate the light strips 28.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A paving and lighting system comprising:

a plurality of frame members being arranged with respect to each other to define a framework, the framework lying substantially on a plane, the framework defines a plurality of paver receiving cells;

a plurality of light strips, each light strip of the plurality of light strips being coupled to and positioned atop an associated frame member of the plurality of frame members;

a plurality of paver tiles, each paver tile of the plurality of paver tiles being positioned in an associated paver receiving cell of the plurality of paver receiving cells;

a processor being operatively coupled to each light strip of the plurality of light strips, the processor selectively operating the plurality of light strips to emit a selected light pattern; and wherein each frame member of the plurality of frame members forms a closed loop, the lighting groove extending fully around the closed loop, the wiring groove extending fully around the closed loop, the plurality of frame members being positioned in abutment with each other in a tessellation.

2. The system of claim 1, wherein:

each frame member of the plurality of frame members defines a lighting groove on a top side of the frame member; and each light strip of the plurality of light strips is positioned in the lighting groove of the associated frame member.

3. The system of claim 2, wherein each frame member of the plurality of frame members has a wiring groove on a bottom side of the frame member, the wiring groove having a size such that the wiring groove is configured for receiving wiring, each frame member of the plurality of frame members having a pair of wiring holes extending through the frame member from the lighting groove to the wiring groove, each wiring hole of the pair of wiring holes having a size such that the wiring hole is configured for receiving the wiring.

4. The system of claim 1, wherein each light strip of the plurality of light strips comprises a plurality of light sources, the plurality of light sources being evenly spaced along a length of the light strip.

5. The system of claim 4, wherein each light source of the plurality of light sources comprises a light-emitting diode.

6. The system of claim 4, wherein each light strip of the plurality of light strips comprises a plurality of circuit modules, each circuit module being operatively coupled to an associated light source of the plurality of light sources such that each light source of the plurality of light sources is individually addressable.

7. The system of claim 4, wherein each light strip of the plurality of light strips comprises a diffuser being positioned above the plurality of light sources with respect to the associated frame member, the diffuser comprising a light-diffusing material such that the diffuser is configured to diffuse light produced by the plurality of light sources.

8. The system of claim 7, wherein the light-diffusing material comprises silicone.

9. The system of claim 1, wherein each paver tile of the plurality of paver tiles is complementary in shape to the associated paver receiving cell.

10. The system of claim 1, further comprising a controller being operatively coupled to the processor.

11. The system of claim 1, wherein each frame member of the plurality of frame members is elongated, the lighting groove extending fully along a length of the frame member, the wiring groove extending fully along the length of the frame member, each light strip of the plurality of light strips extends fully along the length of the associated frame member.

12. The system of claim 1, further comprising a fill medium being positioned over the framework between the plurality of paver tiles and the plurality of light strips.

13. The system of claim 12, wherein the fill medium comprises a polymer cement mortar.

14. The system of claim 1, wherein the closed loop has a hexagonal shape, each frame member of the plurality of frame members having a plurality of notches on a bottom side of the frame member such that the plurality of frame members facilitate a passage of the wiring between the wiring grooves of adjacent frame members of the plurality of frame members.

15. A paving and lighting system comprising:

a plurality of frame members being arranged with respect to each other to define a framework, the framework lying substantially on a plane, the framework defines a plurality of paver receiving cells;

a plurality of light strips, each light strip of the plurality of light strips being coupled to and positioned atop an associated frame member of the plurality of frame members;

a plurality of paver tiles, each paver tile of the plurality of paver tiles being positioned in an associated paver receiving cell of the plurality of paver receiving cells;

a processor being operatively coupled to each light strip of the plurality of light strips, the processor selectively operating the plurality of light strips to emit a selected light pattern;

wherein each frame member of the plurality of frame members is elongated, the lighting groove extending fully along a length of the frame member, the wiring groove extending fully along the length of the frame member, each light strip of the plurality of light strips extends fully along the length of the associated frame member; and wherein the plurality of frame members includes:

a set of first frame members being evenly spaced from each other in a first direction, each first frame member of the plurality of frame members extending in a second direction perpendicular to the first direction;

a set of second frame members, each second frame member extending between an associated pair of adjacent first frame members of the plurality of first frame members, wherein each first frame member of the associated pair of adjacent first frame members has a notch adjacent to the second frame member which is in fluid communication with the wiring groove of the first frame member and the wiring groove of the second frame member; and a pair of boundary frame members, each boundary frame member of the pair of boundary frame members extending along a boundary of the framework in the first direction and being spaced from each other in the second direction;

wherein each payer receiving cell of the plurality of paver receiving cells has a rectangular shape.

16. A paving and lighting system comprising:

a plurality of frame members being arranged with respect to each other to define a framework, the framework lying substantially on a plane, the framework defines a plurality of paver receiving cells;

a plurality of light strips each light strip of the plurality of light strips being coupled to and positioned atop an associated frame member of the plurality of frame members;

a plurality of paver tiles, each paver tile of the plurality of paver tiles being positioned in an associated paver receiving cell of the plurality of paver receiving cells;

a processor being operatively coupled to each light strip of the plurality of light strips, the processor selectively operating the plurality of light strips to emit a selected light pattern;

wherein each frame member of the plurality of frame members is elongated, the lighting groove extending fully along a length of the frame member, the wiring groove extending fully along the length of the frame member, each light strip of the plurality of light strips extends fully along the length of the associated frame member; and a plurality of end caps, each end cap of the plurality of end caps being positioned on an associated end of a pair of ends of an associated light strip of the plurality of light strips, each end cap having an inverted L-shape such that the end cap extends over an adjacent frame member, each end cap of the plurality of end caps comprising the light-diffusing material.

17. A paving and lighting system comprising:

a plurality of frame members being arranged with respect to each other to define a framework, the framework lying substantially on a plane, the framework defines a plurality of paver receiving cells, each frame member of the plurality of frame members defines a lighting groove on a top side of the frame member, each frame member of the plurality of frame members having a wiring groove on a bottom side of the frame member, the wiring groove having a size such that the wiring groove is configured for receiving wiring, each frame member of the plurality of frame members having a pair of wiring holes extending through the frame member from the lighting groove to the wiring groove, each wiring hole of the pair of wiring holes having a size such that the wiring hole is configured for receiving the wiring;

a plurality of light strips, each light strip of the plurality of light strips being coupled to and positioned atop an associated frame member of the plurality of frame members, each light strip of the plurality of light strips being positioned in the lighting groove of the associated frame member, each light strip of the plurality of light strips comprising:

a plurality of light sources, the plurality of light sources being evenly spaced along a length of the light strip, each light source of the plurality of light sources comprising a light-emitting diode;

a plurality of circuit modules, each circuit module being operatively coupled to an associated light source of the plurality of light sources such that each light source of the plurality of light sources is individually addressable; and a diffuser being positioned above the plurality of light sources with respect to the associated frame member, the diffuser comprising a light-diffusing material such that the diffuser is configured to diffuse light produced by the plurality of light sources, the light-diffusing material comprising silicone:

a plurality of paver tiles, each paver tile of the plurality of paver tiles being positioned in an associated paver receiving cell of the plurality of paver receiving cells, each paver tile of the plurality of paver tiles being complementary in shape to the associated paver receiving cell;

a processor being operatively coupled to each light strip of the plurality of light strips, the processor being positioned remotely from the framework, the processor selectively operating the plurality of light strips to emit a selected light pattern;

a power source being electrically coupled to the processor and each light strip of the plurality of light strips;

a controller being operatively coupled to the processor;

wherein each frame member of the plurality of frame members is elongated, the lighting groove extending fully along a length of the frame member, the wiring groove extending fully along the length of the frame member, each light strip of the plurality of light strips extends fully along the length of the associated frame member, the plurality of frame members including:

a set of first frame members being evenly spaced from each other in a first direction, each first frame member of the plurality of frame members extending in a second direction perpendicular to the first direction;

a set of second frame members, each second frame member extending between an associated pair of adjacent first frame members of the plurality of first frame members, wherein each first frame member of the associated pair of adjacent first frame members has a notch adjacent to the second frame member which is in fluid communication with the wiring groove of the first frame member and the wiring groove of the second frame member, and a pair of boundary frame members, each boundary frame member of the pair of boundary frame members extending along a boundary of the framework in the first direction and being spaced from each other in the second direction;

wherein each paver receiving cell of the plurality of paver receiving cells has a rectangular shape; and further comprising:

a plurality of end caps, each end cap of the plurality of end caps being positioned on an associated end of a pair of ends of an associated light strip of the plurality of light strips, each end cap having an inverted L-shape such that the end cap extends over an adjacent frame member, each end cap of the plurality of end caps comprising the light-diffusing material; and a fill medium being positioned over the framework between the plurality of paver tiles and the plurality of light strips, the fill medium comprising a polymer cement mortar.

18. A paving and lighting system comprising:

a plurality of frame members being arranged with respect to each other to define a framework, the framework lying substantially on a plane, the framework defines a plurality of paver receiving cells, each frame member of the plurality of frame members defines a lighting groove on a top side of the frame member, each frame member of the plurality of frame members having a wiring groove on a bottom side of the frame member, the wiring groove having a size such that the wiring groove is configured for receiving wiring, each frame member of the plurality of frame members having a pair of wiring holes extending through the frame member from the lighting groove to the wiring groove, each wiring hole of the pair of wiring holes having a size such that the wiring hole is configured for receiving the wiring;

a plurality of light strips, each light strip of the plurality of light strips being coupled to and positioned atop an associated frame member of the plurality of frame members, each light strip of the plurality of light strips being positioned in the lighting groove of the associated frame member, each light strip of the plurality of light strips comprising:

a plurality of light sources, the plurality of light sources being evenly spaced along a length of the light strip, each light source of the plurality of light sources comprising a light-emitting diode;

a plurality of circuit modules, each circuit module being operatively coupled to an associated light source of the plurality of light sources such that each light source of the plurality of light sources is individually addressable; and a diffuser being positioned above the plurality of light sources with respect to the associated frame member, the diffuser comprising a light-diffusing material such that the diffuser is configured to diffuse light produced by the plurality of light sources, the light-diffusing material comprising silicone:

a plurality of paver tiles, each paver tile of the plurality of paver tiles being positioned in an associated paver receiving cell of the plurality of paver receiving cells, each paver tile of the plurality of paver tiles being complementary in shape to the associated paver receiving cell;

a processor being operatively coupled to each light strip of the plurality of light strips, the processor being positioned remotely from the framework, the processor selectively operating the plurality of light strips to emit a selected light pattern;

a power source being electrically coupled to the processor and each light strip of the plurality of light strips;

a controller being operatively coupled to the processor; and wherein each frame member of the plurality of frame members forms a closed loop, the lighting groove extending fully around the closed loop, the wiring groove extending fully around the closed loop, the plurality of frame members being positioned in abutment with each other in a tessellation, the closed loop having a hexagonal shape, each frame member of the plurality of frame members having a plurality of notches on a bottom side of the frame member such that the plurality of frame members facilitate a passage of the wiring between the wiring grooves of adjacent frame members of the plurality of frame members.

* * * * *